(12) United States Patent
Hu et al.

(10) Patent No.: US 7,158,325 B1
(45) Date of Patent: Jan. 2, 2007

(54) DISK DRIVE HEAD TOUCHDOWN DETECTION WITH IMPROVED DISCRIMINATION

(75) Inventors: Xiaoping Hu, San Jose, CA (US); Yu Sun, Fremont, CA (US); Lin Guo, Milpitas, CA (US); Don Brunnett, Pleasanton, CA (US)

(73) Assignee: Maxtor Corporation, Scotts Valley, CA (US)

( * ) Notice: Subject to any disclaimer, the term of this patent is extended or adjusted under 35 U.S.C. 154(b) by 52 days.

(21) Appl. No.: 10/984,559

(22) Filed: Nov. 8, 2004

Related U.S. Application Data (60) Provisional application No. 60/526,936, filed on Dec. 4, 2003, provisional application No. 60/517,815, filed on Nov. 6, 2003.

(51) Int. Cl.
*G11B 15/18* (2006.01)
(52) U.S. Cl. ........................................................ 360/69
(58) Field of Classification Search ................ 360/69, 360/75, 31, 77.04; 73/865.8; 324/212
See application file for complete search history.

(56) References Cited

U.S. PATENT DOCUMENTS

| | | | | |
|---|---|---|---|---|
| 5,545,989 A | * | 8/1996 | Tian et al. ................... | 324/212 |
| 5,594,595 A | * | 1/1997 | Zhu ............................ | 360/31 |
| 5,742,446 A | * | 4/1998 | Tian et al. ................... | 360/75 |
| 5,824,920 A | * | 10/1998 | Sugimoto et al. .......... | 73/865.8 |
| 6,097,559 A | * | 8/2000 | Ottesen et al. ............. | 360/31 |
| 6,164,118 A | * | 12/2000 | Suzuki et al. ............... | 73/1.89 |
| 6,678,108 B1 | * | 1/2004 | Smith et al. ............. | 360/77.04 |
| 6,747,824 B1 | * | 6/2004 | Smith .......................... | 360/31 |
| 2003/0193727 A1 | * | 10/2003 | Fioravanti et al. ............ | 360/31 |

* cited by examiner

*Primary Examiner*—Fred F. Tzeng
(74) *Attorney, Agent, or Firm*—Tejpal S. Hansra (57) ABSTRACT

A disk drive detects head touchdown based on a magnitude of a position error signal at a discrete frequency. The discrete frequency is one-half the disk rotation frequency or an integral multiple of the disk rotation frequency. The head is heated by turning on a heater at the discrete frequency, thereby injecting bias into a servo system that increases the PES magnitude. In addition, the servo system has a first transfer function for tracking the head during read and write operations and a second transfer function for tracking the head during head touchdown detection. The second transfer function has smaller vibration rejection than the first transfer function so that the disk drive is less sensitive to vibration during read and write operations than during head touchdown detection.

130 Claims, 5 Drawing Sheets

FIG. 5A PES AT ONE-HALF DISK ROTATION FREQUENCY DURING HEAD TOUCHDOWN

FIG. 5B PES AT ONE-HALF DISK ROTATION FREQUENCY DURING TRACK FOLLOWING

FIG. 6 PES AT ONE-HALF DISK ROTATION FREQUENCY THROUGH FOUR DISK REVOLUTIONS DURING HEAD TOUCHDOWN

DISK DRIVE HEAD TOUCHDOWN DETECTION WITH IMPROVED DISCRIMINATION

CROSS-REFERENCE TO RELATED APPLICATIONS

This application claims priority from U.S. Provisional Application Ser. No. 60/517,815, filed Nov. 6, 2003, and from U.S. Provisional Application Ser. No. 60/526,936, filed Dec. 4, 2003, both of which are incorporated herein by reference in their entireties.

FIELD OF THE INVENTION

The present invention is directed to detection of head touchdown in a disk drive.

BACKGROUND INFORMATION

Disk drives (and other data-recording or playback devices) operate with a read/write head at a nominal distance above the disk, known as the fly height. Head touchdown occurs when the head effectively or substantially contacts the disk. Head touchdown detection is especially useful in disk drives which provide fly height adjustment.

Disk drives have detected head touchdown using a heater in the head. The disk drive supplies power to the heater so that the head thermally expands and protrudes towards the disk, thereby lowering the fly height. The power is supplied to the heater while the head is positioned over test tracks or other non-data-bearing areas of the disk and does not perform read or write operations. As more power is supplied to the heater, head touchdown is monitored. However, this approach is time consuming, often requiring a large number of disk revolutions (such as 100 disk revolutions) to accumulate sufficient data points.

Disk drives have also detected head touchdown by writing high-frequency patterns in servo fields and detecting the amplitude of such patterns. However, this approach requires new channel features and significant firmware changes and is subject to channel setting, channel noise and the like.

Disk drives include servo systems that position the head relative to the disk using a position error signal (PES) during track following, as is typical during read and write operations. The servo system reduces the impact of vibration or other external disturbances on the PES to avoid track misregistration. However, the servo system can also reduce the sensitivity of the PES to head touchdown. As a result, the servo system may be unable to distinguish or detect head touchdown ("false negative"), thereby damaging the head.

Accordingly, there is a need for a disk drive that detects head touchdown reliably, accurately and quickly.

SUMMARY OF THE INVENTION

The present invention provides a disk drive that detects head touchdown based on a signal value of a signal related to tracking the head at a discrete frequency.

In an embodiment, the discrete frequency is one-half the disk rotation frequency or an integral multiple (harmonic) of the disk rotation frequency.

In another embodiment, the head includes a heater and the head is heated by turning on the heater at a heater frequency, thereby injecting bias into the servo system that increases the signal value at the heater frequency. The heater frequency is one-half the disk rotation frequency or an integral multiple of the disk rotation frequency. In addition, the discrete frequency is the heater frequency or an integral multiple of the heater frequency.

In another embodiment, the servo system has a first transfer function for tracking the head during read and write operations and a second transfer function for tracking the head during head touchdown detection. The second transfer function has smaller vibration rejection than the first transfer function so that the disk drive is less sensitive to vibration during read and write operations than during head touchdown detection.

In another embodiment, the signal is a position error signal (PES) and a Fourier transform measures the peak magnitude of the PES at the discrete frequency or at multiple discrete frequencies.

These and other objects, features and advantages of the invention will be apparent from the following description taken in conjunction with the following drawings.

DETAILED DESCRIPTION OF THE PREFERRED EMBODIMENTS

Figure 1:
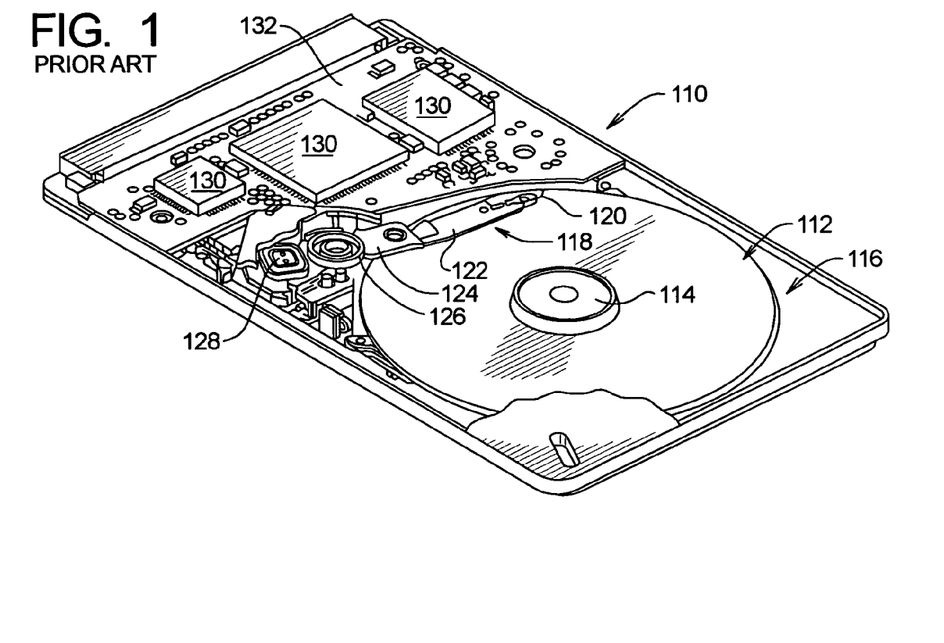
FIG. 1 is a diagrammatic representation of a conventional disk drive with its top cover removed.

FIG. 1 illustrates a conventional disk drive 110 that includes a magnetic storage disk 112 that is rotated by a spindle motor 114. The spindle motor 114 is mounted on a base plate 116. An actuator arm assembly 118 is also mounted on the base plate 116.

The actuator arm assembly 118 includes a read/write head 120 mounted on a flexure arm 122 which is attached to an actuator arm 124 that rotates about a bearing assembly 126. The actuator arm assembly 118 also contains a voice coil motor 128 which moves the head 120 relative to the disk 112. The spindle motor 114, the head 120 and the voice coil motor 128 are coupled to electronic circuits 130 mounted on a printed circuit board 132. The electronic circuits 130 include a read channel, a microprocessor-based controller and a random access memory (RAM).

The disk drive 110 typically includes multiple disks 112 and therefore multiple actuator arm assemblies 118. However, the disk drive 110 can include a single disk 112 and a single actuator arm assembly 118.

Figure 2:
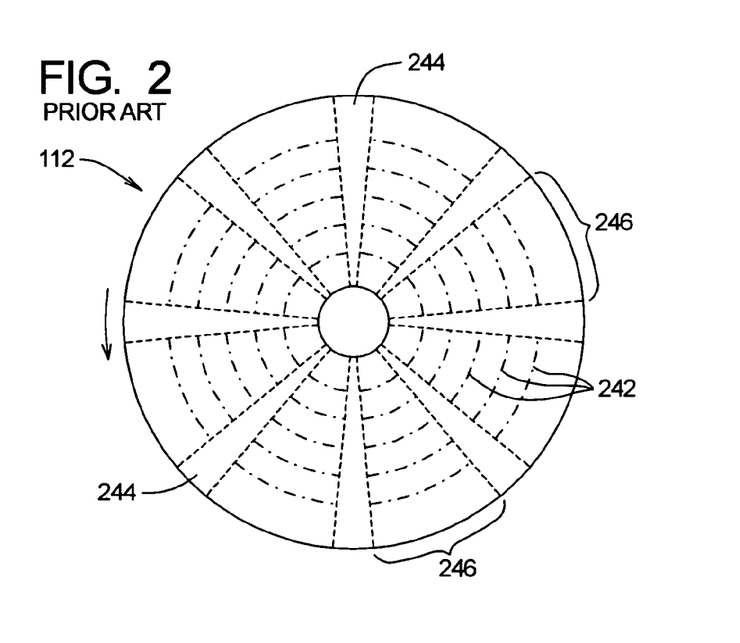
FIG. 2 is a diagrammatic representation of a top view of a magnetic storage disk illustrating a typical organization of data.

FIG. 2 illustrates the disk 112 with a typical organization of data. The disk 112 includes concentric data storage tracks 242 for storing data. The tracks 242 are illustrated as centerlines, however the tracks 242 each occupy a finite width about a corresponding centerline. The disk 112 also includes radially-aligned servo spokes (or wedges) 244 that cross the tracks 242 and store servo information in servo sectors in the tracks 242. The servo information is read by the head 120 during read and write operations to position the head 120 above a desired track 242. The disk 112 also includes customer data regions 246 between the servo spokes 244 that cross the tracks 242 and store customer data in data sectors in the tracks 242.

Although a small number of the tracks 242, the servo spokes 244 and the customer data regions 246 are shown for ease of illustration, the actual number of the tracks 242, the servo spokes 244 and the customer data regions 246 is considerably larger.

The present invention takes advantage of one or more distinctive PES frequencies during head touchdown to detect head touchdown with improved signal-to-noise ratio. For example, a PES frequency at one-half the disk rotation frequency (0.5 F) can achieve a signal-to-noise ratio of about 50 (or more). Likewise, a PES frequency or additional PES frequencies at harmonics such as 1.0 F, 1.5 F and 2.0 F can be used.

Figure 3A:
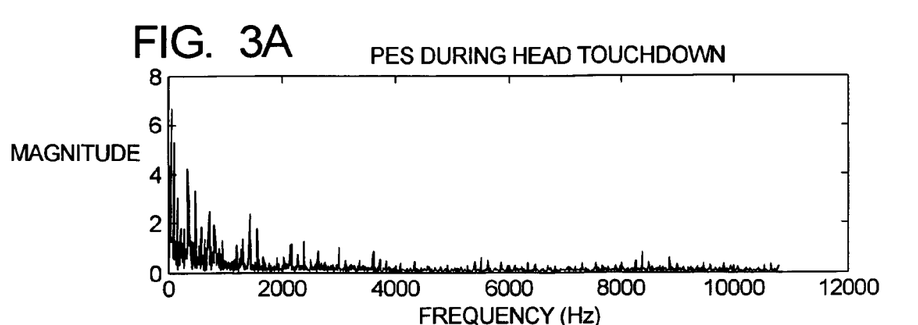
FIG. 3A is a graph of PES frequency distribution during head touchdown.
Figure 3B:
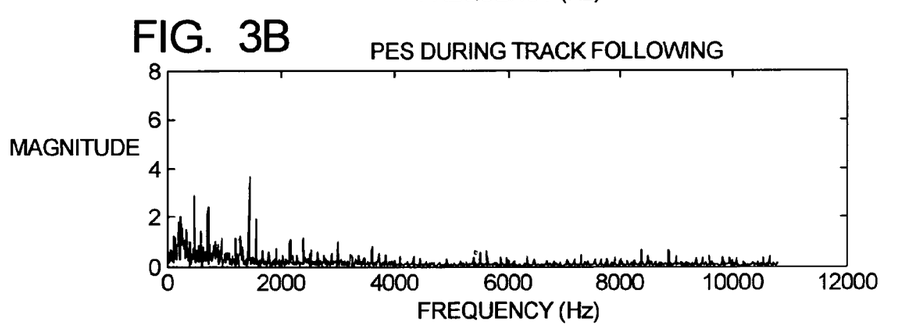
FIG. 3B is a graph of PES frequency distribution during track following.
Figure 4A:
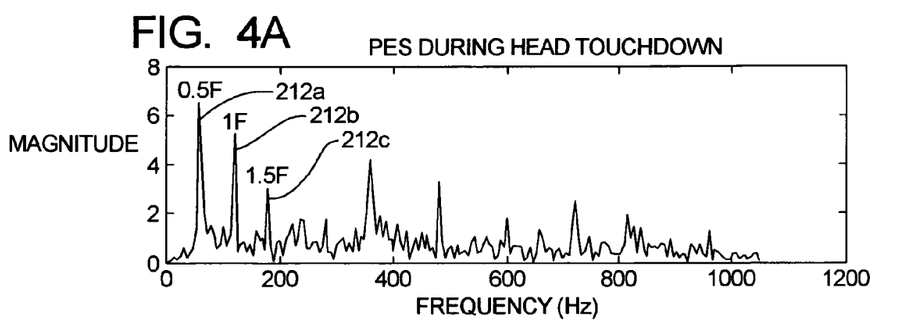
FIG. 4A is a graph corresponding to FIG. 3A at the lower frequencies.
Figure 4B:
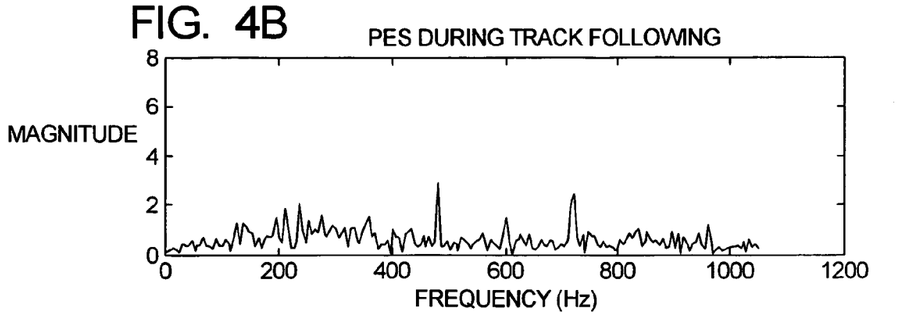
FIG. 4B is a graph corresponding to FIG. 3B at the lower frequencies.

FIGS. 3A, 3B, 4A and 4B show graphs of PES frequency distribution obtained using a fast Fourier transform (FFT). FIGS. 3A and 4A show PES frequency distributions during head touchdown, and FIGS. 3B and 4B show PES frequency distributions during track following. FIGS. 3A and 3B have a frequency range of 0 to 12,000 Hz, and FIGS. 4A and 4B show the lower frequency range of 0 to 1200 Hz in FIGS. 3A and 3B, respectively. The PES magnitude is determined by digital-to-analog converter (DAC) counts.

FIGS. 3A, 3B, 4A and 4B indicate that the PES has a greater power concentration in the lower frequencies during head touchdown than during track following. For instance, FIG. 4A shows head touchdown characterized by peaks at 0.5 F (412a), 1 F (412b) and 1.5 F (412c), and the 0.5 F peak (412a) has the largest magnitude.

Head touchdown is detected by monitoring for peaks or increases in the PES at particular frequencies or frequency ranges, particularly at frequencies substantially equal to the frequency at which bias which increases the PES magnitude is injected into the servo system by a heater in the head.

The changes or peaks in PES power at particular frequencies can be measured in a wide variety of ways. For instance, disk drives that apply a single point discrete Fourier transform (DFT) to the PES for adaptive runout correction can also apply the single point DFT to the PES for head touchdown detection with little or no additional computation time and relatively little firmware modification. Moreover, the single point DFT can calculate the sine and cosine coefficients in each servo interrupt service request so that head touchdown is detected in real time rather than post-process. For example, in a real time calculation, the heater can be turned off whenever the 0.5 F PES magnitude is greater than a predetermined threshold (even before reaching 4 disk revolutions). However, head touchdown detection may require adjusting the single point DFT. For example, with 0.5 F detection, an even number of disk revolutions is used to obtain the sine and cosine coefficients. Furthermore, since only the magnitude of the 0.5 F component is needed, a peak or increase in the sum of squares of the sine and cosine coefficients for this frequency can indicate head touchdown.

Figure 5A:
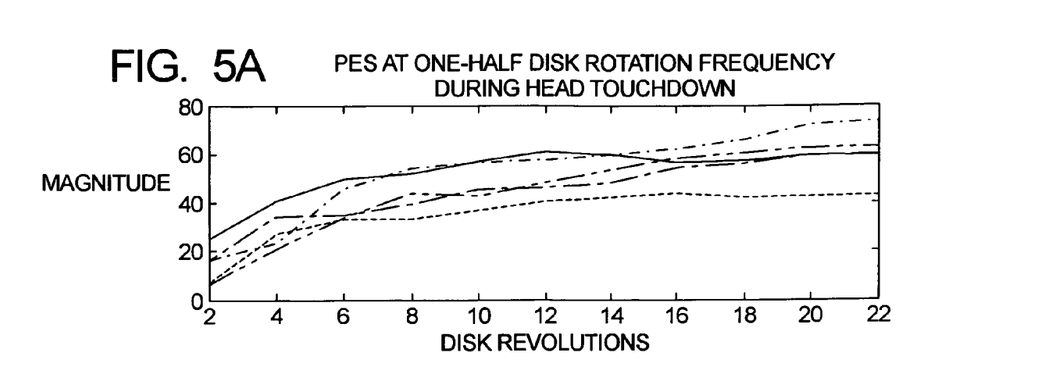
FIG. 5A is a graph of PES convergence at one-half the disk rotation frequency for multiple disk revolutions during head touchdown.
Figure 5B:
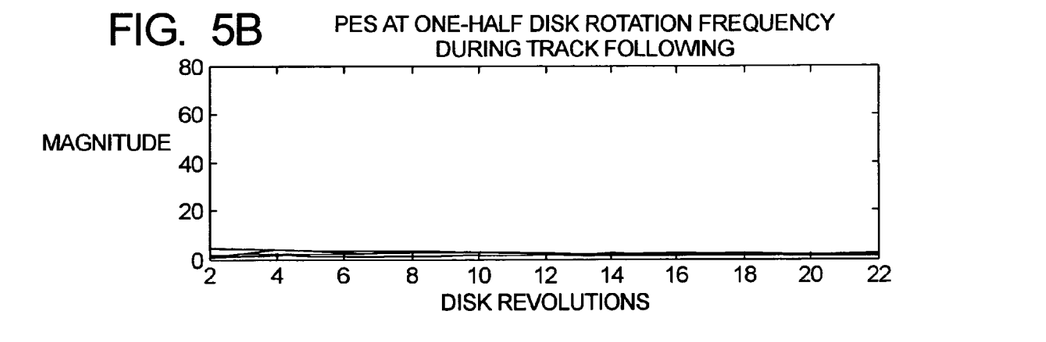
FIG. 5B is a graph of PES convergence at one-half the disk rotation frequency for multiple disk revolutions during track following.

FIGS. 5A and 5B are graphs of PES convergence at one-half the disk rotation frequency for multiple test runs through 22 disk revolutions during head touchdown (FIG. 5A) and track following (FIG. 5B). The PES converges in about 20 disk revolutions. Because the PES magnitude at 0.5 F during track following is relatively small, it is possible to detect head touchdown before the coefficients settle. In some instances, the PES magnitude at 0.5 F is sufficient to detect head touchdown within 4 disk revolutions.

Figure 6:
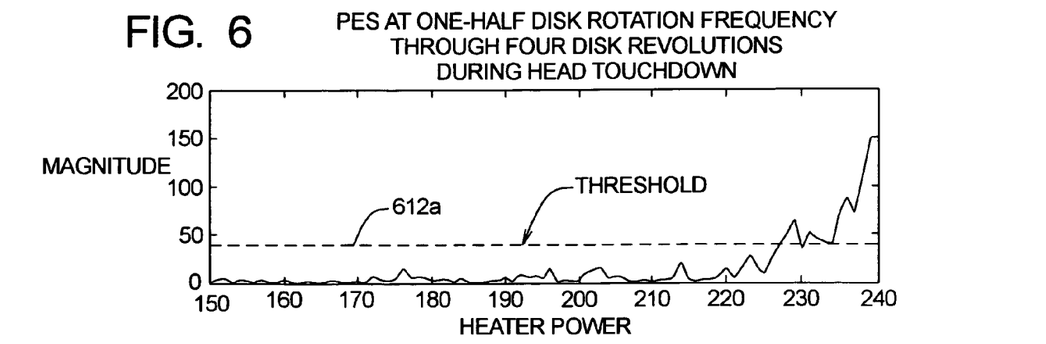
FIG. 6 is a graph of PES as a function of heater power during head touchdown.

FIG. 6 is a graph of PES at one-half the disk rotation frequency as a function of heater power through 4 disk revolutions during head touchdown. The PES magnitude has a distinct increase at the threshold 612 as the heater power increases.

The present invention improves head touchdown detection by adjusting the transfer function of the servo system. A transfer function with low vibration sensitivity reduces track misregistration during read and write operations but is counterproductive during head touchdown detection. Likewise, a transfer function with high vibration sensitivity enables accurate head touchdown detection but causes track misregistration during read and write operations. The present invention solves this problem by using a first transfer function with low vibration sensitivity during read and write operations and a second transfer function with high vibration sensitivity during head touchdown detection.

The transfer functions can be adjusted to have different vibration sensitivities in a wide variety of ways. For example, H2/Hinfinity-based optimization (which forms the weighting function based on the objectives) can be employed. As another example, a cost function based, random searching technique with the cost function objective being to maximize the ratio of PES shock to PES on-track can be used.

Figure 7:
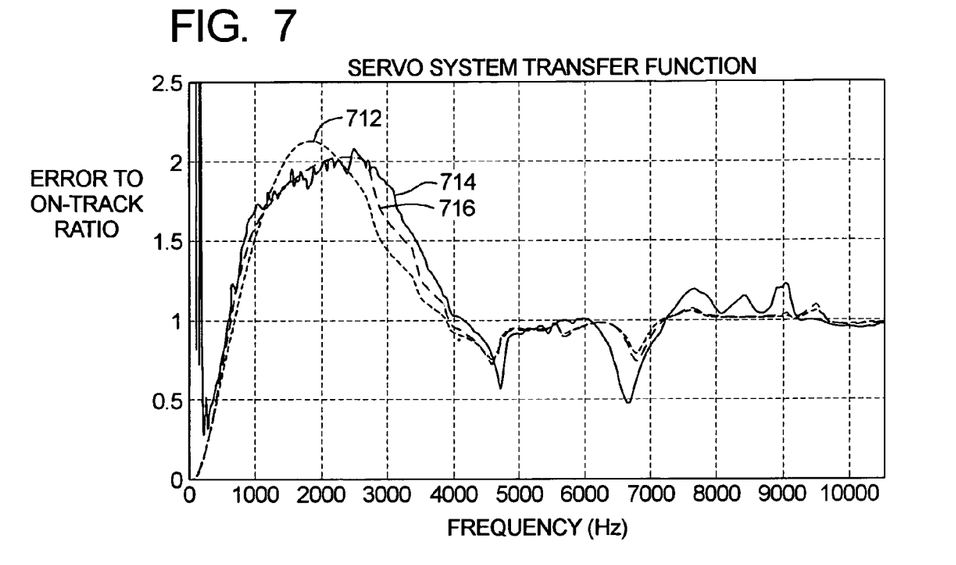
FIG. 7 is a graph of servo system transfer functions with different sensitivity.

FIG. 7 is a graph of servo system transfer functions with different sensitivity. The transfer functions are defined by a ratio of error to on-track (unitless) as a function of frequency. A head touchdown transfer function 712, measured transfer function 714 and modeled transfer function 716 are shown. The head touchdown transfer function 712 has higher attenuation than the transfer functions 714 and 716 below a cut-off frequency of about 1000 Hz and higher amplification than the transfer functions 714 and 716 between about 1200 Hz and about 2400 Hz.

Figure 8:
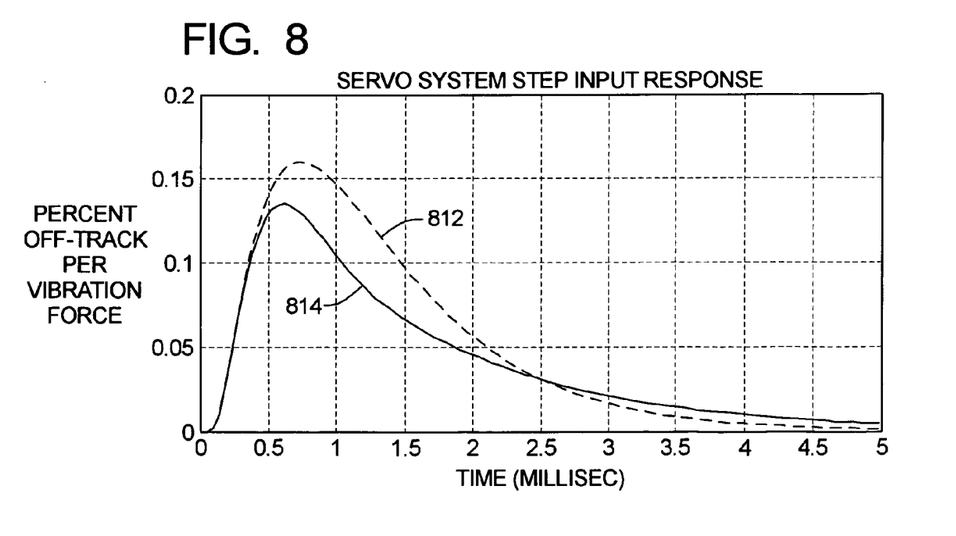
FIG. 8 is a graph of modeled servo system response to a step input using different transfer functions during track following.

FIG. 8 is a graph of modeled servo system response to a step input using different transfer functions during track following. The response 812 is obtained using the head touchdown transfer function 712, and the response 814 is obtained using a less sensitive transfer function. The response 812 yields about 25 percent higher sensitivity to external disturbance than the response 814.

Because head touchdown provides a substantially step impulse, the head touchdown transfer function 712 is expected to attenuate the PES less than the measured transfer function 714 during head touchdown, whereas the measured transfer function 714 is expected to provide acceptable on-track performance during read and write operations.

Figure 9:
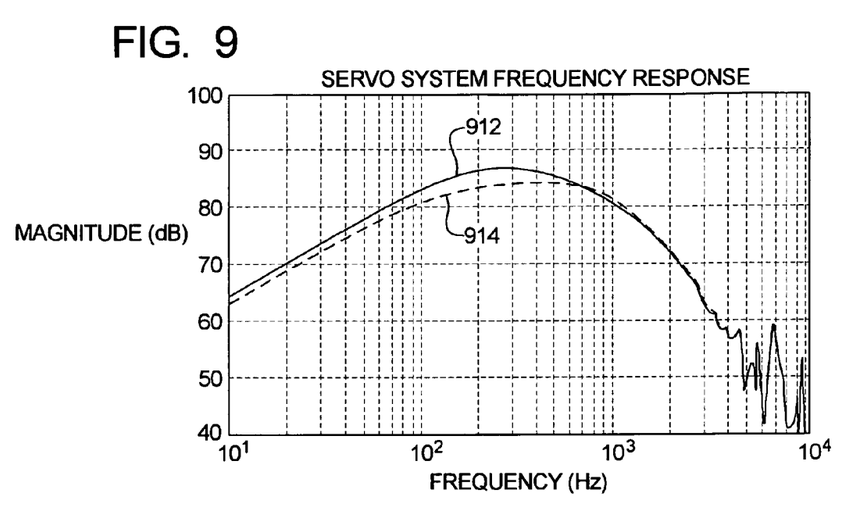
FIG. 9 is a graph of servo system frequency response using different transfer functions.

FIG. 9 is a graph of servo system frequency response (in decibels) as a function of frequency (on a logarithmic scale). The frequency response 912 is obtained using the head touchdown transfer function 712, and the frequency response 914 is obtained using a less sensitive transfer function.

Figure 10:
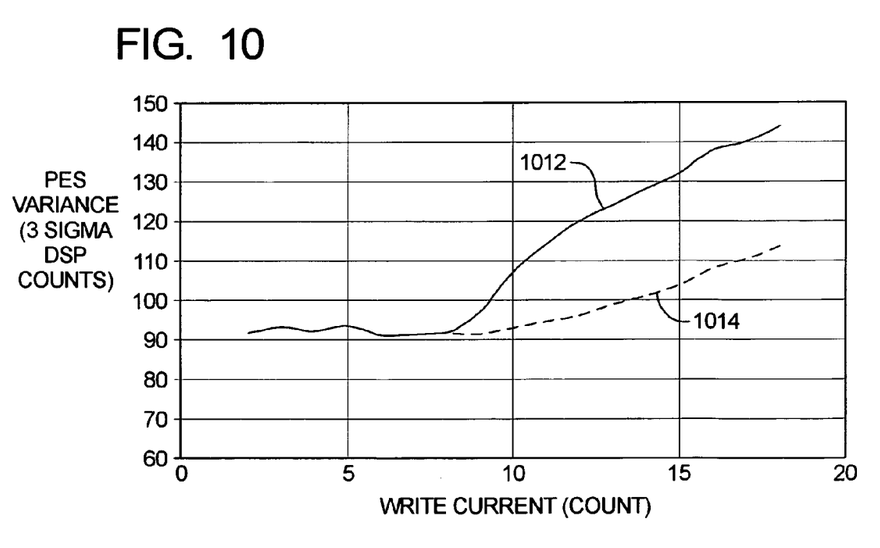
FIG. 10 is a graph of PES variance as a function of write current using different transfer functions.

FIG. 10 is a graph of PES variance as a function of write current using different transfer functions. The PES variance 1012 is obtained using the head touchdown transfer function 712, and the PES variance 1014 is obtained using a less sensitive transfer function. Head touchdown detection using PES variance is facilitated using the transfer function 712.

This present invention can provide rapid head touchdown detection, preferably requiring less than about 50 disk revolutions, more preferably less than about 10 disk revolutions, more preferably less than about 6 disk revolutions, and even more preferably with as few as 2 to 4 disk revolutions.

The present invention includes numerous variations and modifications. Likewise, various features of the present invention can be used without others. For example, head touchdown can be detected based on PES peaks at certain frequencies (or combinations thereof) without adjusting the vibration sensitivity of the servo system.

Although a disk drive has been described, head touchdown can be detected in other data storage devices with magnetic disks, compact disks, digital versatile disks and optical systems. Although a PES has been measured, the signal related to head tracking that is measured at a discrete frequency to detect head touchdown can be an integration (nulli) signal, a head velocity signal, a bias current signal and combinations thereof. Although the PES magnitude has been measured with a power-frequency spectrum using a Fourier transform, the PES magnitude can be measured with other analyses or transformations that achieve the desired discrimination of head touchdown from vibration or other phenomena. Although the PES has been measured at a discrete frequency to detect head touchdown, the PES can be measured at multiple discrete frequencies in frequency bands that include harmonics and/or subharmonics of a root frequency such as one-half the disk rotation frequency, and head touchdown can be detected using the multiple discrete frequencies. Advantageously, frequencies below the disk rotation frequency (such as 0.5 F) lack repeatable runout.

The disk drive can detect head touchdown in the context of fly height adjustment or preventing excessive pole tip protrusion. The disk drive can also detect head touchdown during factory calibration, upon boot-up, at periodic intervals, in response to a threshold number of errors, or in response to environmental changes such as temperature and pressure changes. The disk drive can also detect head touchdown as part of an error recovery procedure. For example, in a write recovery table, head touchdown can be detected in test tracks to reveal a touchdown-induced error.

The discrete frequency can be set to the heater frequency or harmonics or subharmonics thereof. Likewise, the heater frequency can be set to the disk rotation frequency or harmonics or subharmonics thereof. For example, the heater can be cycled at alternate disk revolutions (heater turned on for one disk revolution, heater turned off for one disk revolution) and the discrete frequency can be set to the heater frequency (0.5 F). As another example, the heater can be cycled at ¼ disk revolutions (heater turned on for ⅛ disk revolution, heater turned off for ⅛ disk revolution) and the discrete frequency can be set to the heater frequency at the fourth harmonic (4F).

The first transfer function can suppress vibration, and the second transfer function can permit vibration. Therefore, even if the first transfer function suppresses head touchdown, the first transfer function is disabled and the second transfer function is enabled during head touchdown detection.

The foregoing discussion of the invention has been presented for purposes of illustration and description and is not intended to limit the invention to the form disclosed herein. Although the description of the invention has included embodiments and certain variations and modifications, other variations and modifications are within the scope of the invention, as may be within the skill and knowledge of those in the art, after understanding the present disclosure.

What is claimed is:

1. A disk drive, comprising:
    a disk;
    a head that reads from and writes to the disk, wherein the head includes a controllable heater; and
    a controller that receives signal related to tracking the head, determines a signal value related to selected frequency of the signal, turns on the heater at a heater frequency that is substantially equal to the selected frequency and uses the signal value in determining head touchdown.

2. The disk drive of claim 1 wherein the disk is a magnetic disk.

3. The disk drive of claim 1 wherein the signal a position error signal.

4. The disk drive of claim 1 wherein the signal is selected from the group consisting of an integration signal, a head velocity signal and a bias current signal.

5. The disk drive of claim 1 wherein the controller is a programmed microprocessor.

6. The disk drive of claim 1 wherein the signal value is indicative of a peak in signal power at the discrete frequency.

7. The disk drive of claim 1 wherein the signal value is indicative of an increase in signal power at the discrete frequency.

8. The disk drive of claim 1 wherein the signal value is indicative of a magnitude of power at the discrete frequency.

9. The disk drive of claim 1 wherein the signal value is determined using a discrete Fourier transform.

10. The disk drive of claim 9 wherein the discrete Fourier transform is used for adaptive runout correction.

11. The disk drive of claim 1 wherein the discrete frequency is an integral multiple of one-half of the disk's rotation frequency.

12. The disk drive of claim 1 wherein the discrete frequency is one-half of the disk's rotation frequency.

13. The disk drive of claim 1, wherein the heater frequency is equal to the discrete frequency.

14. The disk drive of claim 1 wherein the head touchdown is determined in fewer than about 20 revolutions of the disk.

15. The disk drive of claim 1 wherein the head touchdown is determined in fewer than about 6 revolutions of the disk.

16. The disk drive of claim 1 wherein the head touchdown is determined during factory calibration of the disk drive.

17. The disk drive of claim 1 wherein the head touchdown is determined upon boot-up of the disk drive.

18. The disk drive of claim 1 wherein the head touchdown is determined periodically.

19. The disk drive of claim 1 wherein the head touchdown is determined in response to an error.

20. The disk drive of in claim 1 wherein the head touchdown is determined in response to environmental changes.

21. A disk drive, comprising:
    a disk;
    a head that reads from and writes to the disk;

a controller that uses a first transfer function for tracking the head during read and write operations of the head and uses a second transfer function for tracking the head during head touchdown detection, wherein the first transfer function has a vibration rejection with a first magnitude and the second transfer function has a vibration rejection with a second magnitude that is smaller than the first magnitude.

22. The disk drive of claim 21 wherein the controller uses a position error signal for tracking the head.

23. The disk drive of claim 21 wherein the head touchdown is determined during factory calibration of the disk drive.

24. The disk drive of claim 21 wherein the head touchdown is determined upon boot-up of the disk drive.

25. The disk drive of claim 21 wherein the head touchdown is determined periodically.

26. The disk drive of claim 21 wherein the head touchdown is determined in response to an error.

27. The disk drive of claim 21 wherein the head touchdown is determined in response to environmental changes.

28. A method of detecting head touchdown in a disk drive that includes a disk and a head that reads from and writes to the disk, wherein the head includes a controllable heater, the method comprising:
    receiving a signal related to tracking the head;
    determining a signal value related to a discrete frequency of the signal;
    turning on the heater at a heater frequency that is substantially equal to the discrete frequency; and
    determining of a head touchdown using the signal value.

29. The method of claim 28 wherein the signal is a position error signal.

30. The method of claim 28 wherein the signal value is indicative of a peak in signal power at the discrete said first frequency.

31. The method of claim 28 wherein the signal value is indicative of an increase in signal power at the discrete frequency.

32. The method of claim 28 wherein the signal value is indicative of a magnitude of power at the discrete frequency.

33. The method of claim 28 wherein the signal value is determined using a discrete Fourier transform.

34. The method of claim 33 wherein the discrete Fourier transform is used for adaptive runout correction.

35. The method of claim 28 wherein the discrete frequency is an integral multiple of one-half of the disk's rotation frequency.

36. The method of claim 28 wherein the discrete frequency is one-half of the disk's rotation frequency.

37. The method of claim 28, wherein the heater frequency is equal to the discrete frequency.

38. The method of claim 28 wherein the head touchdown is determined in fewer than about 20 revolutions of the disk.

39. The method of claim 28 wherein the head touchdown is determined in fewer than about 6 revolutions of the disk.

40. The method of claim 28 further comprising determining the head touchdown during factory calibration of the disk drive.

41. The method of claim 28 further comprising determining the head touchdown upon boot-up of the disk drive.

42. The method of claim 28 further comprising determining the head touchdown periodically.

43. The method of claim 28 further comprising determining the head touchdown in response to an error.

44. The method of claim 28 further comprising determining the head touchdown in response to environmental changes.

45. A method of detecting head touchdown in a disk drive that includes a disk and a head that reads from and writes to the disk, the method comprising:
    using a first transfer function for tracking the head during read and write operations of the head; and
    using a second transfer function for tracking the head during head touchdown detection, wherein the first transfer function has a vibration rejection with a first magnitude and the second transfer function has a vibration rejection with a second magnitude that is smaller than the first magnitude.

46. The method of claim 45 further comprising using a position error signal for tracking the head.

47. The method of claim 45 further comprising determining the head touchdown during factory calibration of the disk driver.

48. The method of claim 45 further comprising determining the head touchdown upon boot-up of the disk drive.

49. The method of claim 45 further comprising determining the head touchdown periodically.

50. The method of claim 45 further comprising determining the head touchdown in response to an error.

51. The method of claim 45 further comprising determining the head touchdown in response to environmental changes.

52. A disk drive, comprising:
    a disk;
    a head that reads from and writes to the disk;
    means for positioning the head relative to the disk;
    means for receiving, a signal related to tracking the head;
    means for determining a signal value related to discrete frequency of the signal;
    means for turning on a controllable heater for the head at a heater frequency that is substantially equal to the discrete frequency; and
    means for determining head touchdown using the signal value.

53. The disk drive of claim 52 wherein the means for determining head touchdown is a programmed microprocessor.

54. The disk drive of claim 52 wherein the signal is a position error signal.

55. The disk drive of in claim 52 wherein the signal value is indicative of a peak in signal power at the discrete frequency.

56. The disk drive of claim 52 wherein the signal value is indicative of an increase in signal power at the discrete frequency.

57. The disk drive of claim 52 wherein the signal value is indicative of a magnitude of power at the discrete frequency.

58. The disk drive of claim 52 wherein the signal value is determined using a discrete Fourier transform.

59. The disk drive of in claim 52 wherein the discrete frequency is an integral multiple of one-half of the disk's rotation frequency.

60. The disk drive of claim 52 wherein the discrete frequency is one-half of the disk's rotation frequency.

61. The disk drive of claim 52 wherein the heater frequency is equal to the discrete frequency.

62. An apparatus usable in a data storage device having a rotatable disk with tracks thereon, a positionable head, and an actuator for performing tracking by positioning head relative to a selected track, the apparatus comprising:

means for controlling the actuator to achieve the tracking according to either a first or a second transfer function;
means for using the first transfer function for tracking during normal read-write operations of the head; and
means for using the second transfer function for tracking during a head touchdown detection operation of the data storage device.

63. The apparatus of claim 62 wherein the means for using the first transfer function and the means for using the second transfer function are a programmed microprocessor.

64. The apparatus of claim 62 wherein the transfer function has a vibration rejection with a first magnitude and the second transfer function has a vibration rejection with a second magnitude that is smaller than the first magnitude.

65. A disk drive, comprising:
a disk;
a head that reads from and writes to the disk; and
a controller that receives a signal related to tracking the head, determines a signal value related to a discrete frequency of the signal that is one-half of the disk's rotation frequency and uses the signal value in determining head touchdown.

66. The disk drive of claim 65 wherein the signal value is a peak amplitude of the signal at the discrete frequency.

67. The disk drive of claim 66 wherein the signal is a position error signal.

68. A disk drive, comprising:
a disk;
a head that reads from and writes to the disk; and
a controller that receives a signal related to tracking the head, determines a signal value related to a discrete frequency of the signal that is an integral multiple of one-half of the disk's rotation frequency and uses the signal value in determining head touchdown.

69. The disk drive of claim 68 wherein the signal value is a peak amplitude of the signal at the discrete frequency.

70. The disk drive of claim 69 wherein the signal is a position error signal.

71. In a disk drive that includes a disk, a head that reads from and writes to the disk and a servo system that positions the head relative to the disk, a method of detecting head touchdown in which the head contacts the disk, the method comprising:
generating a position error signal (PES) in response to the head reading servo information from the disk while the disk rotates at a disk rotation frequency;
selecting a PES frequency of the PES in response to the disk rotation frequency;
measuring a PES magnitude of the PES at the PES frequency; and
determining the head touchdown in response to the PES magnitude.

72. The method of claim 71 wherein the PES frequency is one-half the disk rotation frequency.

73. The method of claim 71 wherein the PES frequency is the disk rotation frequency.

74. The method of claim 71 wherein the PES frequency is one and one-half the disk rotation frequency.

75. The method of claim 71 wherein the PES frequency is an integral multiple of one-half the disk rotation frequency.

76. The method of claim 71 further comprising turning on a heater in the head in response to the disk rotation frequency, thereby injecting bias into the servo system that increases the PES magnitude.

77. The method of claim 76 wherein the heater is a write element.

78. The method of claim 76 wherein the heater frequency is the PES frequency.

79. The method of claim 78 wherein the heater frequency is one-half the disk rotation frequency.

80. The method of claim 78 wherein the heater frequency is an integral multiple of one-half the disk rotation frequency.

81. The method of claim 71 further comprising selecting a first transfer function for the servo system for read and write operations of the head and selecting a second transfer function for the servo system for determining the head touchdown.

82. The method of claim 81 wherein the first transfer function is more sensitive to vibration than the second transfer function.

83. The method of claim 82 wherein the first transfer function suppresses vibration and the second transfer function does not suppress vibration.

84. The method of claim 83 wherein the PES frequency is one-half the disk rotation frequency.

85. The method of claim 83 wherein the PES frequency is an integral multiple of one-half the disk rotation frequency.

86. The method of claim 71 further comprising:
selecting a first PES frequency of the PES in response to the disk rotation frequency;
measuring a first PES magnitude of the PES at the first PES frequency;
selecting a second PES frequency of the PES in response to the disk rotation frequency, wherein the second PES frequency is greater than the first PES frequency;
measuring a second PES magnitude of the PES at the second PES frequency; and
determining the head touchdown in response to the first and second PES magnitudes.

87. The method of claim 86 wherein the first PES frequency is one-half the disk rotation frequency.

88. The method of claim 86 wherein the second PES frequency is an integral multiple of one-half the disk rotation frequency.

89. The method of claim 86 wherein the first PES frequency is one-half the disk rotation frequency and the second PES frequency is an integral multiple of one-half the disk rotation frequency.

90. The method of claim 89 wherein the second PES frequency is the disk rotation frequency.

91. In a disk drive that includes a disk, a head that reads from and writes to the disk and a servo system that positions the head relative to the disk, a method of detecting head touchdown in which the head contacts the disk, the method comprising:
generating a position error signal (PES) in response to the head reading servo information from the disk while the disk rotates at a disk rotation frequency;
selecting a PES frequency of the PES in response to the disk rotation frequency, wherein the PES frequency is one-half the disk rotation frequency or an integral multiple of one-half the disk rotation frequency;
measuring a PES magnitude of the PES at the PES frequency; and
determining head touchdown in response to the PES magnitude exceeding a threshold.

92. The method of claim 91 wherein the PES frequency is one-half the disk rotation frequency.

93. The method of claim 91 wherein the PES frequency is an integral multiple of one-half the disk rotation frequency.

94. The method of claim 91 further comprising turning on a heater in the head at the PES frequency, thereby injecting bias into the servo system that increases the PES magnitude.

95. The method of claim 91 further comprising selecting a first transfer function for the servo system for read and write operations of the head and selecting a second transfer function for the servo system for determining the head touchdown, wherein the first transfer function is more sensitive to vibration than the second transfer function.

96. The method of claim 91 further comprising:
selecting a first PES frequency of the PES as one-half the disk rotation frequency;
measuring a first PES magnitude of the PES at the first PES frequency;
selecting a second PES frequency of the PES as an integral multiple of one-half the disk rotation frequency;
measuring a second PES magnitude of the PES at the second PES frequency; and
determining the head touchdown in response to the first and second PES magnitudes.

97. The method of claim 91 further comprising performing the method upon boot-up of the disk drive.

98. The method of claim 91 further comprising performing the method periodically.

99. The method of claim 91 further comprising performing the method in response to an error.

100. The method of claim 91 further comprising performing the method in response to environmental changes.

101. In a disk drive that includes a disk, a head that reads from and writes to the disk and a servo system that positions the head relative to the disk, wherein the head includes a heater, a method of detecting head touchdown in which the head contacts the disk, the method comprising:
generating a position error signal (PES) in response to the head reading servo information from the disk while the heater is turned on at a heater frequency and the disk rotates at a disk rotation frequency;
selecting a PES frequency of the PES in response to the heater frequency;
measuring a PES magnitude of the PES at the PES frequency; and
determining the head touchdown in response to the PES magnitude.

102. The method of claim 101 wherein the heater frequency is one-half the disk rotation frequency.

103. The method of claim 102 wherein the PES frequency is the heater frequency.

104. The method of claim 102 wherein the PES frequency is an integral multiple of the heater frequency.

105. The method of claim 101 wherein the heater frequency is an integral multiple of one-half the disk rotation frequency.

106. The method of claim 105 wherein the PES frequency is the heater frequency.

107. The method of claim 105 wherein the PES frequency is an integral multiple of the heater frequency.

108. The method of claim 101 wherein the PES frequency is the heater frequency.

109. The method of claim 101 wherein the PES frequency is an integral multiple of the heater frequency.

110. The method of claim 101 wherein turning on the heater injects bias into the servo system that increases the PES magnitude.

111. The method of claim 101 further comprising selecting a first transfer function for the servo system for read and write operations of the head and selecting a second transfer function for the servo system for determining the head touchdown.

112. The method of claim 111 wherein the first transfer function is more sensitive to vibration than the second transfer function.

113. The method of claim 112 wherein the first transfer function suppresses vibration and the second transfer function does not suppress vibration.

114. The method of claim 113 wherein the heater frequency is one-half the disk rotation frequency.

115. The method of claim 113 wherein the heater frequency is an integral multiple of one-half the disk rotation frequency.

116. The method of claim 101 further comprising:
selecting a first PES frequency of the PES in response to the heater frequency;
measuring a first PES magnitude of the PES at the first PES frequency;
selecting a second PES frequency of the PES in response to the heater frequency, wherein the second PES frequency is greater than the first PES frequency;
measuring a second PES magnitude of the PES at the second PES frequency; and
determining the head touchdown in response to the first and second PES magnitudes.

117. The method of claim 116 wherein the first PES frequency is one-half the disk rotation frequency.

118. The method of claim 116 wherein the second PES frequency is an integral multiple of one-half the disk rotation frequency.

119. The method of claim 116 wherein the first PES frequency is one-half the disk rotation frequency and the second PES frequency is an integral multiple of one-half the disk rotation frequency.

120. The method of claim 119 wherein the second PES frequency is the disk rotation frequency.

121. In a disk drive that includes a disk, a head that reads from and writes to the disk and a servo system that positions the head relative to the disk, wherein the head includes a heater, a method of detecting head touchdown in which the head contacts the disk, the method comprising:
generating a position error signal (PES) in response to the head reading servo information from the disk while the heater is turned on at a heater frequency and the disk rotates at a disk rotation frequency;
selecting a PES frequency of the PES in response to the heater frequency, wherein the heater frequency is one-half the disk rotation frequency or an integral multiple of one-half the disk rotation frequency;
measuring a PES magnitude of the PES at the PES frequency, wherein the heater injects bias into the servo system that increases the PES magnitude at the heater frequency; and
determining head touchdown in response to the PES magnitude exceeding a threshold.

122. The method of claim 121 wherein the heater frequency is one-half the disk rotation frequency.

123. The method of claim 121 wherein the heater frequency is an integral multiple of one-half the disk rotation frequency.

124. The method of claim 121 wherein the PES frequency is the heater frequency.

125. The method of claim 121 further comprising selecting a first transfer function for the servo system for read and write operations of the head and selecting a second transfer function for the servo system for determining the head touchdown, wherein the first transfer function is more sensitive to vibration than the second transfer function.

126. The method of claim 121 further comprising:
selecting a first PES frequency of the PES as one-half the disk rotation frequency;
measuring a first PES magnitude of the PES at the first PES frequency;
selecting a second PES frequency of the PES as an integral multiple of one-half the disk rotation frequency;
measuring a second PES magnitude of the PES at the second PES frequency; and
determining the head touchdown in response to the first and second PES magnitudes.

127. The method of claim 121 further comprising performing the method upon boot-up of the disk drive.

128. The method of claim 121 further comprising performing the method periodically.

129. The method of claim 121 further comprising performing the method in response to an error.

130. The method of claim 121 further comprising performing the method in response to environmental changes.

* * * * *